(12) United States Patent
Walsh

(10) Patent No.: US 12,453,343 B1
(45) Date of Patent: Oct. 28, 2025

(54) RODENT CONTROL DEVICE WITH MODULAR RODENT SENSOR HOUSING

(71) Applicant: Bell Laboratories, Inc., Windsor, WI (US)

(72) Inventor: James R. Walsh, Wauwatosa, WI (US)

(73) Assignee: Bell Laboratories, Inc., Windsor, WI (US)

( * ) Notice: Subject to any disclaimer, the term of this patent is extended or adjusted under 35 U.S.C. 154(b) by 0 days.

(21) Appl. No.: 18/740,008

(22) Filed: Jun. 11, 2024

(51) Int. Cl.
*A01M 25/00* (2006.01)

(52) U.S. Cl.
CPC ................. *A01M 25/004* (2013.01)

(58) Field of Classification Search
CPC .................................. A01M 25/004
See application file for complete search history.

(56) References Cited

U.S. PATENT DOCUMENTS

| | | | |
|---|---|---|---|
| 10,897,887 B1 * | 1/2021 | Walsh | A01M 31/002 |
| 10,991,230 B2 | 4/2021 | Triventi et al. | |
| 11,570,978 B2 | 2/2023 | Austin et al. | |
| 11,864,548 B1 * | 1/2024 | Walsh | G01D 5/24 |
| 2004/0216364 A1 | 11/2004 | Gosselin | |
| 2017/0354139 A1 * | 12/2017 | Vickery | A01M 25/004 |
| 2018/0325093 A1 * | 11/2018 | Vickery | A01M 23/18 |
| 2019/0037829 A1 * | 2/2019 | Laut | G01R 33/07 |
| 2022/0192171 A1 | 6/2022 | Ots | |
| 2022/0394970 A1 * | 12/2022 | Kauffman | G01D 5/24 |
| 2023/0061104 A1 * | 3/2023 | Liu | A01M 23/38 |
| 2023/0066844 A1 * | 3/2023 | Chen | A01M 23/38 |
| 2024/0057582 A1 * | 2/2024 | Gannan | A01M 25/004 |

FOREIGN PATENT DOCUMENTS

KR 20080109307 A1 12/2008

* cited by examiner

*Primary Examiner* — Richard G Davis
(74) *Attorney, Agent, or Firm* — Stiennon & Stiennon

(57) ABSTRACT

A rodent control assembly has a module for housing sensor electronics which is insertable through a hole in the rear wall of a rodent control device such as a bait station or a repeating trap. The rodent control device has a bottom wall with portions defining opposed parallel frontwardly extending channels which are accessible through openings in a rear wall. The module has a shell with a front wall which extends upwardly from a platform which defines a threshold for the passage of rodents thereover. Parallel rails extend from the platform sides. The rails are slidably received within the channels, such that the platform passes through the rear wall of the rodent control device to be positioned along an interior rodent runway. The module is fastenable to the rodent control device from the exterior, without requiring opening of the device.

21 Claims, 7 Drawing Sheets

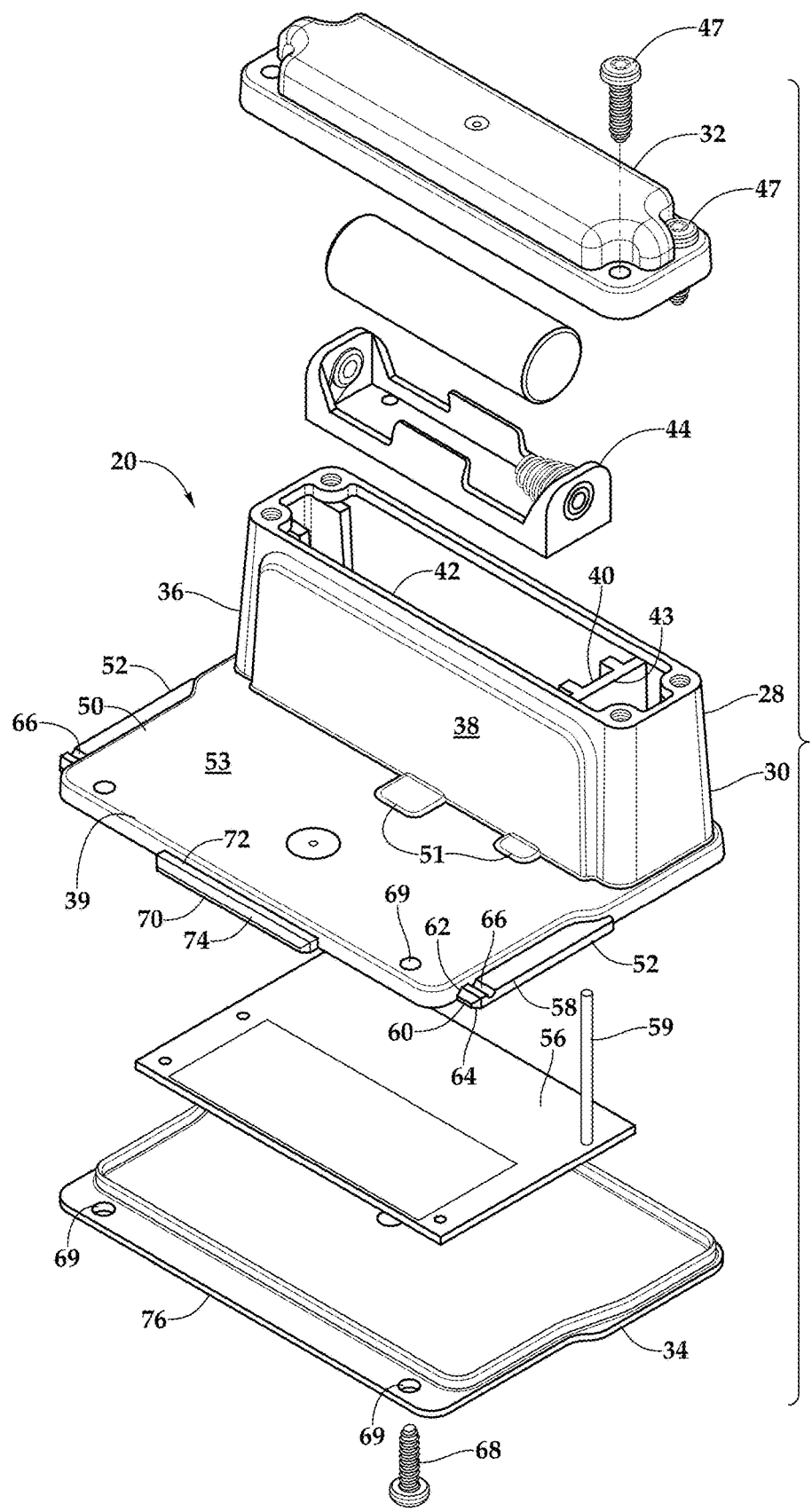
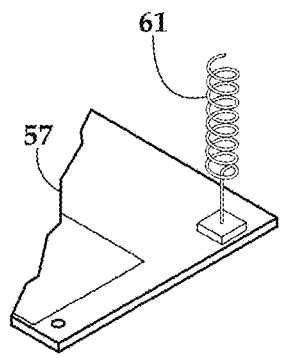
Fig.2
Fig.2A

RODENT CONTROL DEVICE WITH MODULAR RODENT SENSOR HOUSING

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to rodent control devices with electronic detection of rodent presence.

Rodent control devices such as bait stations and repeating traps are deployed to control rat and mouse populations. U.S. Pat. Nos. 10,897,887 and 11,864,548 show bait stations and repeating traps with structure to house capacitive rodent sensors which effectively position the sensors for rodent detection in a manner which protects the sensitive sensor electronics from contamination by the environment or the rodents themselves. The sensor housing structure may be integral to the rodent control device, or may be formed as part of a tray which incorporates interior bait station structure such as bait compartments, which is removable by opening the bait station cover and lifting out the tray.

In extended deployments, the batteries which power electronic sensor elements will lose their charge. For longer lifetime it is desirable to provide rodent control devices which are serviceable to replace batteries or sensors which have served beyond their useful life. Moreover, for effective recycling, when the useful life of a rodent control device is finished, electronic components should be separable from the bulk of the plastic device.

What is needed is a rodent control device in which the electronic sensor elements can be readily serviced or replaced.

SUMMARY OF THE INVENTION

A rodent control assembly has a module for housing sensor electronics which is insertable through a hole in the rear wall of a rodent control device such as a bait station or a repeating trap. The rodent control device has a bottom wall with portions defining opposed parallel frontwardly extending channels which are accessible through openings in a rear wall of the device. The module has a shell with a front wall which extends upwardly from a platform which defines a threshold for the passage of rodents thereover. The shell extends upwardly from the platform and provides volume for a battery and a rod-like antenna or a spiral LORA antenna. Parallel rails extend from the platform sides which are slidably received within the rearwardly opening channels. In the installed position, the platform passes through the rear wall of the rodent control device to be positioned along an interior rodent runway. The module may be fastened to the rodent control device by screws which extend upwardly through the platform into downwardly opening mounting points in the device floor. The module can thus be inserted and into the rodent control device entirely from the exterior without the requirement of opening the cover of the device.

The structure of the module is such that the same module can be used with different rodent control devices, with the volume of the shell able to be accommodated on the interior of a larger device such as a rat bait station, and on the exterior of smaller devices such as a mouse bait station or compact repeating trap. Yet, in each instance, the platform extends within the interior of the rodent control device for securely positioning rodent detecting electronics such as a capacitive sensor.

It is an object of the present invention to provide a rodent control device with a module for electronic elements which can be serviced entirely from the outside of the rodent enclosure.

It is a further object of the present invention to provide a module for rodent sensing electronics which can be employed across a variety of rodent control devices.

It is another object of the present invention to provide a module for rodent sensing electronics which can be releasably secured to a rodent control device from the exterior.

Further objects, features and advantages of the invention will be apparent from the following detailed description when taken in conjunction with the accompanying drawings.

BRIEF DESCRIPTION OF THE DRAWINGS

FIG. 2 is an exploded isometric view of the rodent sensor module of FIG. 1.

FIG. 2a is a fragmentary isometric view of a circuit board with a LoRa antenna.

DESCRIPTION OF THE PREFERRED EMBODIMENTS

Figure 1:
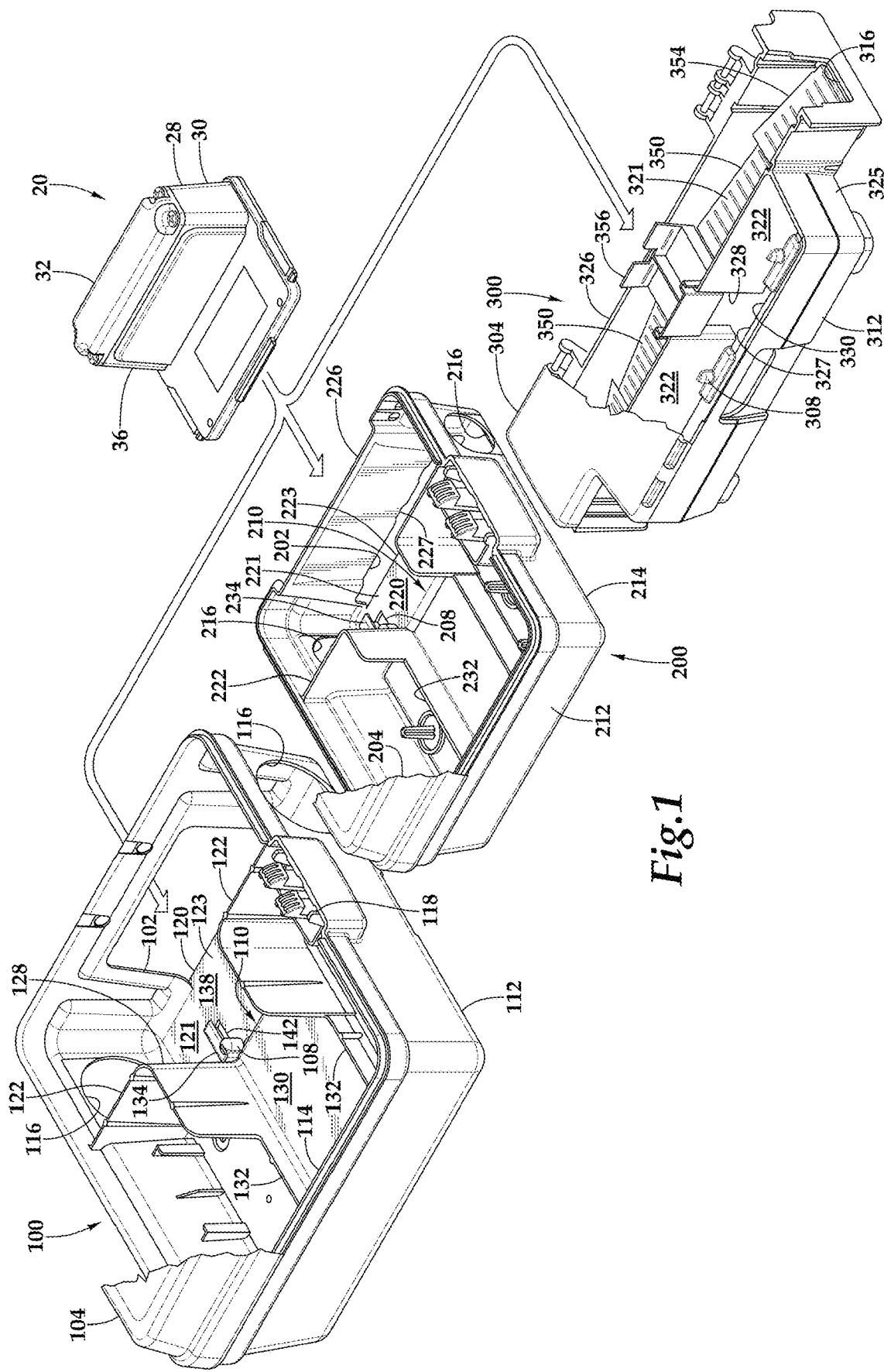
FIG. 1 is a schematic isometric view of three rodent control devices which are configured to receive an identical rodent sensor module.

Referring more particularly to FIGS. 1-12, wherein like numbers refer to similar parts, a sensor module 20 is shown in FIG. 1 for receipt within a variety of covered rodent control devices, such as a rat bait station 100, a mouse bait station 200 and a repeating trap 300. Each rodent control device has a rear opening 102, 202, 302 through which the sensor module is insertable without opening the device cover 104, 204, 304.

As shown in FIG. 2, the sensor module 20 has a molded plastic housing 28 made up of a central element 30 which opens upwardly and downwardly, and a top cover 32 and a bottom cover 34 which are secured to the central element to seal the housing. The housing central element 30 has an upwardly extending shell 36 with a front wall 38 with a platform 39 which projects frontwardly from the shell. The interior volume of the shell 36 has an interior wall 40 which defines a battery compartment 42 on one side and an antenna compartment 43 on the other side. The battery compartment 42 receives a battery holder 44 which releasably engages a battery 46, such as a lithium ion AA battery. The top cover 32 may be removably connected to the central element 30 of the housing by a plurality of screw fasteners 47. The antenna compartment 43 opens downwardly to communicate with an electronics cavity 48 defined between the bottom cover 34 and the platform 39 and receives an antenna 59 which extends upwardly from a circuit board 56. In an alternative embodiment, an alternative circuit board 57 shown in FIG. 2a, employs a spiral LoRa antenna 61, which is also receivable within the housing. The bottom cover may be provided with a resilient foam strip, not shown, which is adhered to the cover to press against the circuit board 57 to urge the circuit board against the platform upper wall 50.

The platform 39 has an upper wall 50 which is generally horizontal and which defines a threshold surface 53 for the passage of rodents thereover. The upper wall 50 may be provided with upwardly protruding projections 51 to accommodate electronic protruding components (not shown) on the circuit board 56 which is retained within the electronics cavity 48. Two parallel rails 52 extend sidewardly from and are spaced on either side of the platform 39. The rails 52 extend frontwardly for reception within channels in the rodent control devices which are accessible through the rear openings 102, 202, 302.

Figure 5:
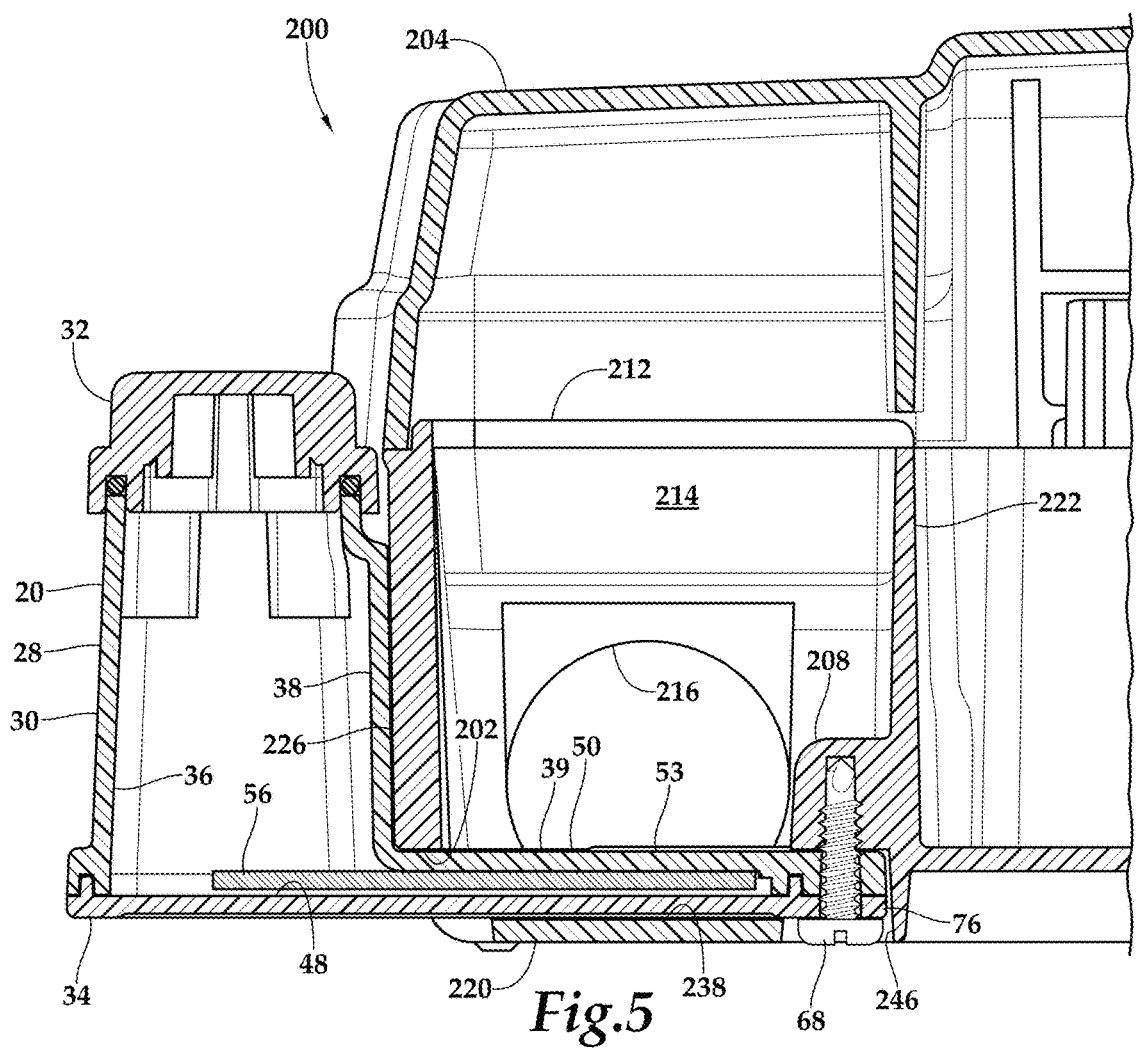
FIG. 5 is a fragmentary cross-sectional view of the mouse bait station of FIG. 4, taken along section line 5-5.
Figure 6:
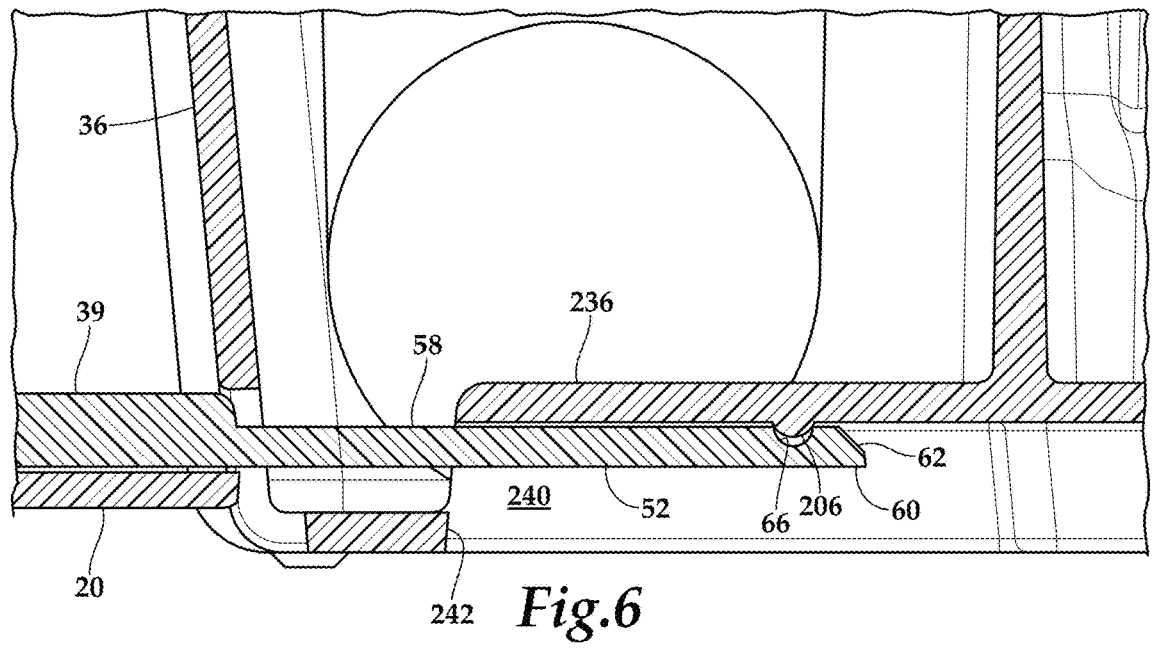
FIG. 6 is a fragmentary cross-sectional view of the mouse bait station of FIG. 4, taken along section line 6-6.
Figure 7:
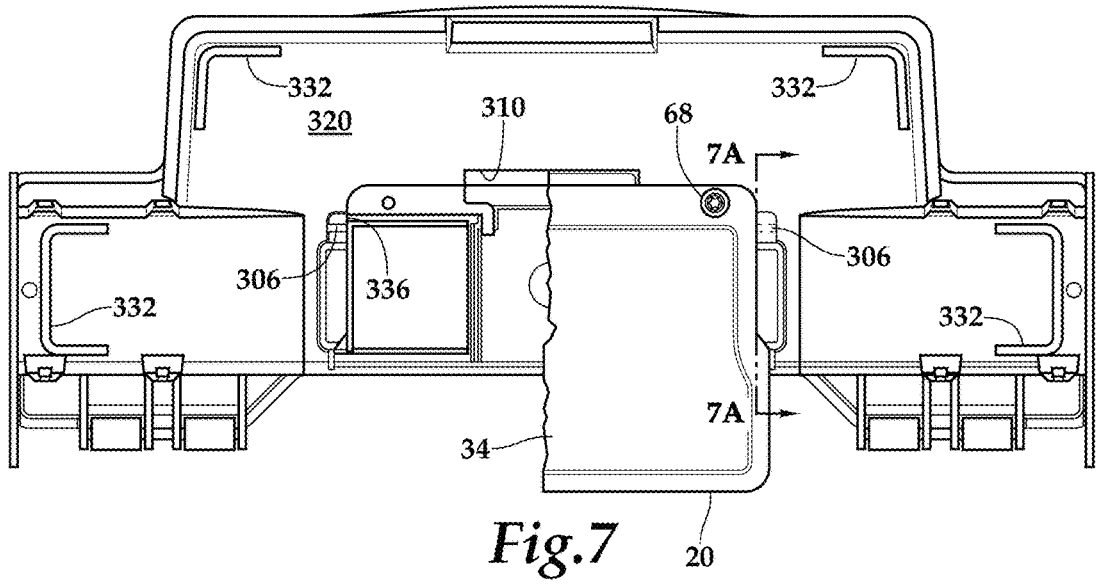
FIG. 7 is a bottom plan view of the repeating rodent trap of FIG. 1, with the rodent sensor module shown broken away.
Figure 7A:
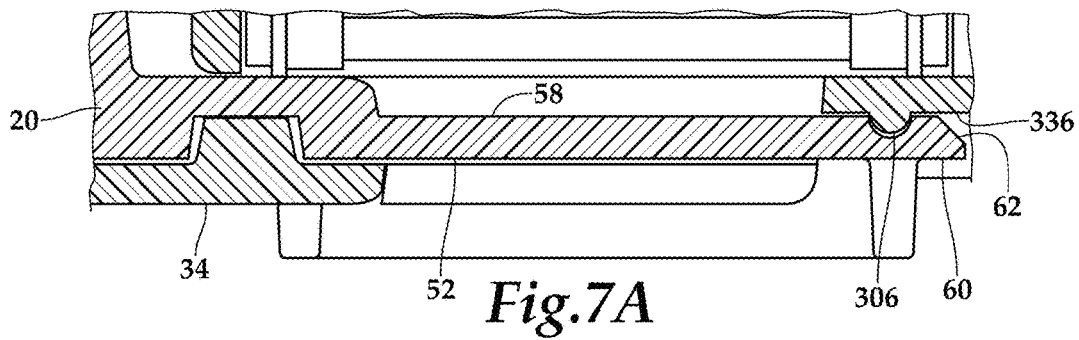
FIG. 7A is a fragmentary cross-sectional view of the rodent trap and sensor module of FIG. 7 taken along section line 7A-7A.
Figure 8:
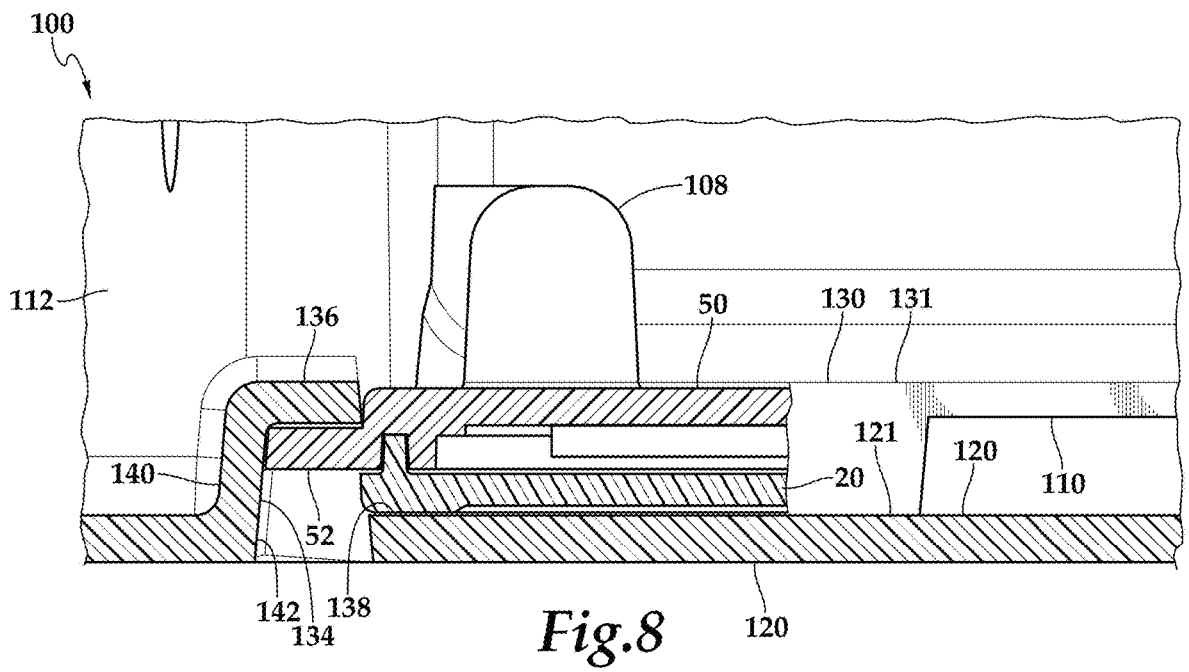
FIG. 8 is a fragmentary cross-sectional view of the rat bait station of FIG. 3, taken along section line 8-8.

As shown in FIGS. 6, 7A and 8, the rails 52 have a vertical thickness which is less than the thickness of the platform 39. Hence the platform 39 upper wall 50 threshold surface is positioned above the level of the upper surfaces 58 of the rails. As shown in FIGS. 2, 6 and 7A, each rail 52 has an entrance portion 60 which has an inclined front upper surface 62 and an inwardly inclined side surface 64. As shown in FIG. 1 and FIG. 6, each rail has an upwardly opening groove 66. The grooves are perpendicular to the front-back direction, and are positioned to receive a downwardly extending detent 106, 206, 306 positioned on the rodent control device. The entrance portions 60 serve to guide the rails 52 into position in the rodent control device, and to assist in mating the grooves 66 with the detents 106, 206, 306. The motion of the module out of engagement with the rodent control device is restrained by the engagement between the grooves and the detents. The module may be further secured to the rodent control device by screw fasteners 68 shown in FIGS. 2 and 5 which extend upwardly into molded plastic bosses 108, 208, 308. The screws 68 and the rails with grooves provide upwardly extending portions of the module in proximity to the platform which are positioned to engage within the rodent control device to restrain motion of the module in a rearward direction. The screws 68 extend through screw holes 69 in the platform and a frontwardly projecting flange 76 of the bottom cover, such that the screw holes do not pass through and compromise the electronics cavity.

As shown in FIG. 2 and FIG. 7 a front register tab 70 projects frontwardly from the platform 39 of the module 20. The front register tab 70 has an upper surface 72 which is below the level of the threshold surface 53 and which may have a frontwardly inclined ramp 74. The front register tab 70 engages within a sidewardly extending slot 110, shown in FIGS. 3 and 8 in the bottom wall of the rodent control device 100 or a slot 210, shown in FIG. 1, of the rodent control device 200, or in a downwardly opening recess 310, shown in FIG. 9, of the rodent control device 300. The engagement between the front register tab 70 with the slots or recess of the rodent control devices serves to position and secure the sensor module in its desired position. In the device 100, shown in FIG. 8, the bottom wall segment 131 at the engagement portion 130 is above the level of the bottom wall at the rodent runway 121 with the result that the threshold surface 53 of the sensor module is approximately at the same level as the bottom wall segment at the engagement portion, providing for minimal impediment to rodent entry. The height of the front register tab 70 is such that engages against the upper limits of the slot 110.

The bottom cover 34 should form a water-tight seal with the central element 30 of the housing to protect the electronics cavity from infiltration of liquid. For example, the bottom cover may be ultrasonically welded to the central element. Alternatively, the bottom cover may be connected to the central element with screw fasteners, as discussed below with respect to FIGS. 10-12.

The electronics within the sensor module 20 serve to sense the presence of a rodent as it passes over the threshold surface 53. The sensor module technology may employ a standard FR4 printed circuit board (PCB) on which is attached a conductive plate forming a capacitive sensor which is positioned beneath the threshold. On the same PCB are mounted a Bluetooth chip set and programmable controller, the antenna, a controller with programmable functionality, and a circuit which detects a change in the capacitance of the conductive plate, thus forming a capacitance sensor. A capacitance sensor can sense through plastic and can sense all types of material including rodents. The life of the electronic module is preserved as it is isolated from moisture, dirt, and rodent waste.

Figure 3:
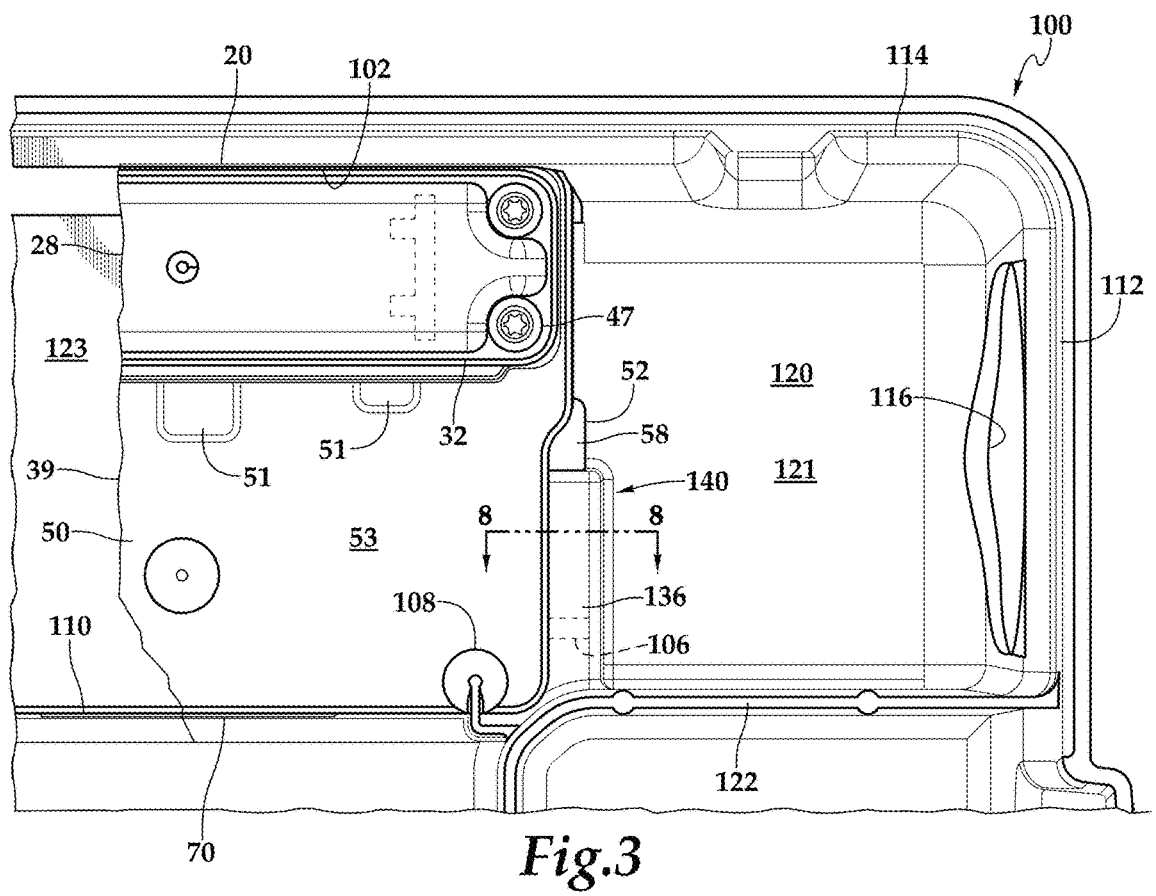
FIG. 3 a fragmentary top plan view of the interior of a rat bait station of FIG. 1.

As shown in FIG. 1, the sensor module 20 may be received into a variety of different rodent control devices 100, 200, 300. The rat bait station 100, shown in FIGS. 1, 3 and 8, has the cover 104 hinged to a base 112. The base has an exterior peripheral wall 114 with two opposed rodent access openings 116 for entrance of rodents into the bait station. The cover 104 is held closed by a latch 118 which may be operated with a key, not shown. The cover 104 closes over the base to define an interior volume of the station surrounded by exterior walls. The bait station 100 has a bottom wall 120 which defines a horizontal floor 123. As shown in FIG. 3, the sensor module 20 is connected to the bait station 100 such that the platform 39 extends over the station bottom wall 120, positioning the threshold surface 53 in the path of a rodent runway 121 which extends between the rodent access openings 116. The rodent runway 121 provides a clear passage for rodents to pass over the sensor module threshold surface from either access opening. The platform and portions of the bottom cover pass through a rear opening 102 in a rear wall 126 which is a portion of the peripheral wall 114 and which extends upwardly from the bottom wall. The rear wall 126 of the base, the bottom wall 120, the peripheral wall 114 and the cover 104 are all parts of the exterior walls of the rodent control device 100.

As shown in FIG. 1, two runway walls 122 extend upwardly from the bottom wall 120 and extend in the direction of the runway 121. The runway walls 122 extend from the exterior peripheral wall 114 towards the center of the station and are spaced from each other at an inlet 128 to a rodent engagement portion 130. The runway walls 122 divide the interior volume into an approach portion comprising the runway 121 and the rodent engagement portion 130. A rodent must pass over the threshold surface 53 of the sensor module to pass through the inlet 128 into the rodent engagement portion 130. Thus the engagement portion is accessible by a rodent which enters one of the two rodent access openings 116. The engagement portion 130 is that part of the station interior where a rodent is exposed to trapping action through a glue board or a mechanical trap, or where rodenticide is dispensed in bait compartments 132.

The bottom wall 120 has two parallel channels 134 which extend rearwardly and which are aligned with the rear opening 102 in the rear wall 126. Only a single channel 134 is shown in FIG. 3, but the second channel, shown in FIG. 1, is symmetrically placed on the opposite side of the one illustrated in FIG. 3. As shown in FIG. 1, each channel 134 is formed by portions of the bottom wall which define a top member 136 and a bottom member 138 spaced from one another with the rearwardly extending channel formed therebetween. As shown in FIG. 8, the bottom member 138 of the channel is part of the horizontal extent of the bottom wall 120 floor 123, while the top member 136 is spaced above the general bottom wall by a side web 140. Thus although the top member 136 is above the bottom member 138, it need not directly overlie it, allowing an opening 142 to be formed directly beneath the top member 136 and facilitating formation of the structure by injection molding.

The sensor module 20 is mounted to the bait station 100 by inserting the platform and underlying bottom cover into the rear opening in the rear wall and sliding it into position. The rails 52 are the outermost portions of the module and the inclined side surfaces 64 of the rails engage the side webs 140 of the channels 134 and help to align the rails with the channels. The module bottom cover is supported on the floor 123 of the station bottom wall and the top member 136 overlies the rail as the module is advanced until the front register tab 70 extends into the transverse slot 110, shown in FIG. 1 and FIG. 3. The sensor module 20 then has reached the end of its travel and the detents 106 are received within the grooves 66 in the rails. In this position, the screw holes 69 in the module 20 are aligned with the bosses 108. The bosses 108 are positioned over bottom openings (not shown) in the bottom wall 120, thereby permitting the screws 68 to pass through the bottom wall and secure the module 20 to the bosses thereby holding the module securely in place within the bait station 100. When the module 20 is inserted into the rodent control device, it blocks the opening 102 to prevent the passage of rodents therethrough. Thus the module 20 can be attached to the bait station 100 entirely from the outside, even without opening the cover 104. The rear wall 126 rear opening 102 extends vertically a height which is greater than the height of the module 20, such that, as shown in FIG. 3, a majority of the volume of the module is received within the interior of the rodent control device frontward of the rear wall. The central element 30 of the housing 28 blocks the rear opening 102.

Figure 4:
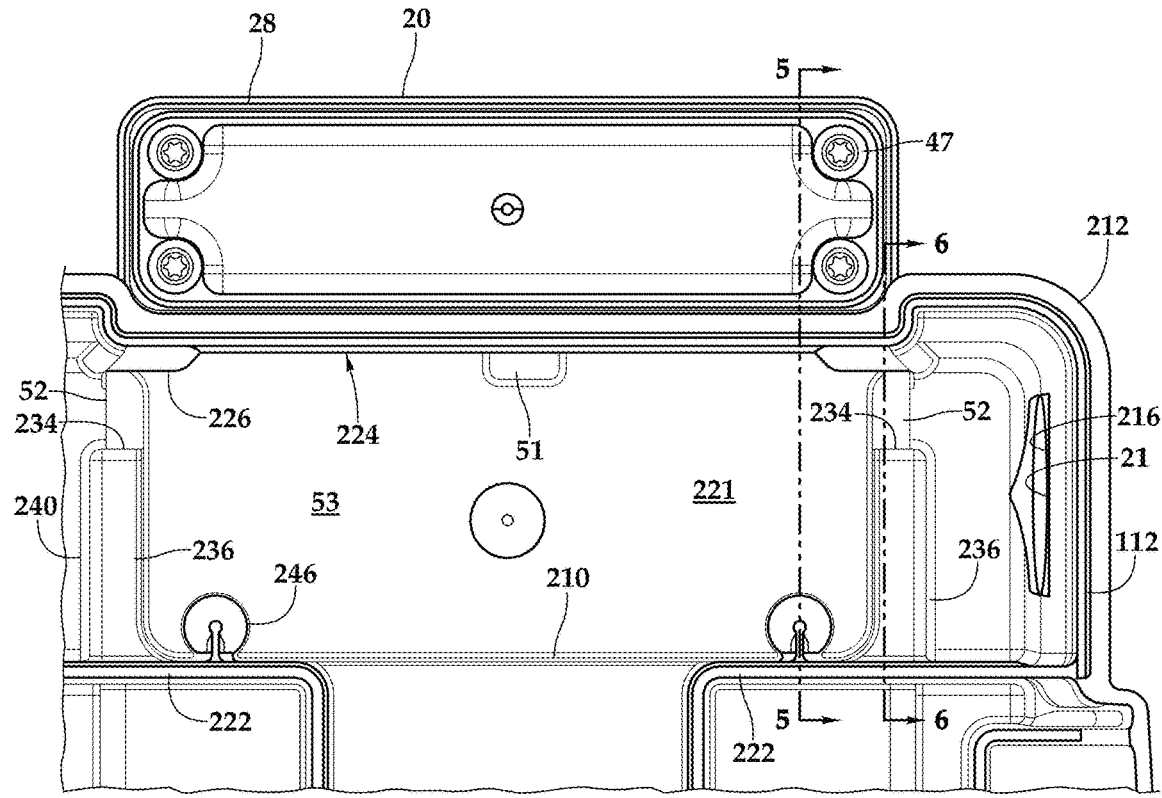
FIG. 4 is a fragmentary top plan view of the interior of a mouse bait station of FIG. 1.

As shown in FIGS. 1 and 4-6, the rodent control device 200 is a mouse bait station having a base 212 with a peripheral wall 214 having rodent access openings 216 on opposite ends of a rodent runway 221 extending across the horizontal floor 223 of the bottom wall 220. The device 200 has runway walls 222 and bait compartments 232 similar to those in the device 100. The smaller bait station 200 does not have sufficient interior volume in its runway 221 to receive the full volume of the sensor module 20. Thus, as shown in FIG. 5, the central element 30 of the sensor module housing is positioned on the exterior of the device 200 and rearwardly of the rear wall 226. The rear opening 202 as shown in FIG. 1, is substantially a slot having a height which is greater than a combined height of the platform 39 and the module bottom cover 34 and is less than the full vertical height of the module. A majority of the volume of the housing shell 36 is positioned exterior to the rear wall. The rear opening 202 may be provided with cut-aways 227 to accommodate the platform upper wall projections 51. As shown in FIG. 4, the bottom wall 220 has structure defining two opposed channels 234 which receive the rails 52 of the sensor module 20. As shown in FIG. 6, each channel has a top member 236 which is spaced above bottom member 238 which is a part of the horizontal floor 223 of the bottom wall, and which is spaced above the floor by a side web 240 which extends from an opening 242 in the floor. The module 20 is inserted through the rear opening 202 until the front register tab 70 enters a transverse slot 210. In its installed position, the grooves 66 in the rails 52 receive the detents 206. The screw fasteners 68 extend through bottom openings 246 and into the bosses 208.

As shown in FIGS. 1, 7, 7A and 9, the rodent control device 300 is a compact repeating trap which has a molded plastic base 312 having a hinged plastic cover 204. The base 312 has a rodent runway 321 defined between a rear exterior wall 326 and two interior walls 322. A gap 328 between the two interior walls 322 provides access from the rodent runway 321 to an interior rodent compartment 330. Rodent access openings 316 are defined in two opposed side walls 325 of the base 312. The trap 300 is provided with structure mounted to the base 312 which permits the ready entrance of rodents into the rodent compartment 330 and which restricts their escape.

As shown in FIG. 1, a molded plastic entrance ramp 350 is pivotably mounted to the base in the runway 321 adjacent each access opening 316. The entrance ramp 350 has pivot pins, not shown, which are received within mounting holes (not shown) formed in the rear wall 326 and one of the interior walls 322. The pivot pins are positioned more closely to the outward end of the ramp 350 than to the inward end. A counterweight, not shown, is mounted near the outward end of each ramp 350 which serves to retain the inward end of the ramp elevated when no weight is placed on the ramp at a position inward of the pivot pins.

A molded plastic pivot barrier 354 is shorter than the entrance ramp 350, and is also mounted by sidewardly extending pivot pins to holes molded into the rear exterior wall and one of the interior walls. The pivot barrier 354 extends from the access opening 316 to about the position of the pivot axis of the entrance ramp 350.

As a rodent approaches the trap 300, the pivot barrier 354 and the entrance ramp 350 appear to form a nearly continuous pathway along the runway 321. As the rodent enters the runway 321 and treads upon the pivot barrier 354, the pivot barrier 354 is pressed down upon the ramp 350. As the rodent moves past the ramp pivot axis defined between the opposed pivot pins, the ramp will begin to pivot downward. Proceeding along the ramp 350, the weight of the rodent will overcome the counterweight on the ramp 350, and the rodent will then pass over the ramp and be discharged from the ramp at a position adjacent the gap 328 between the interior walls 322, providing entrance to the interior compartment 330. It is at this location that the platform 39 of the sensor module 20 is positioned, making it possible to detect the entrance of a rodent into the rodent compartment 330. Once the rodent has stepped off the entrance ramp 350, the ramp inward end will return to an elevated position. The rodent is then trapped within the rodent control device 300.

A center element 356 engages with the base 312 above the rodent runway 321 to prevent escape of the rodent from the trap 300. If a rodent is able to move back onto the entrance ramp 350, the downward pivoting of the inward end of the ramp will cause the pivot barrier 354 to rotate outwardly and block the lower part of the access opening 316.

Figure 9:
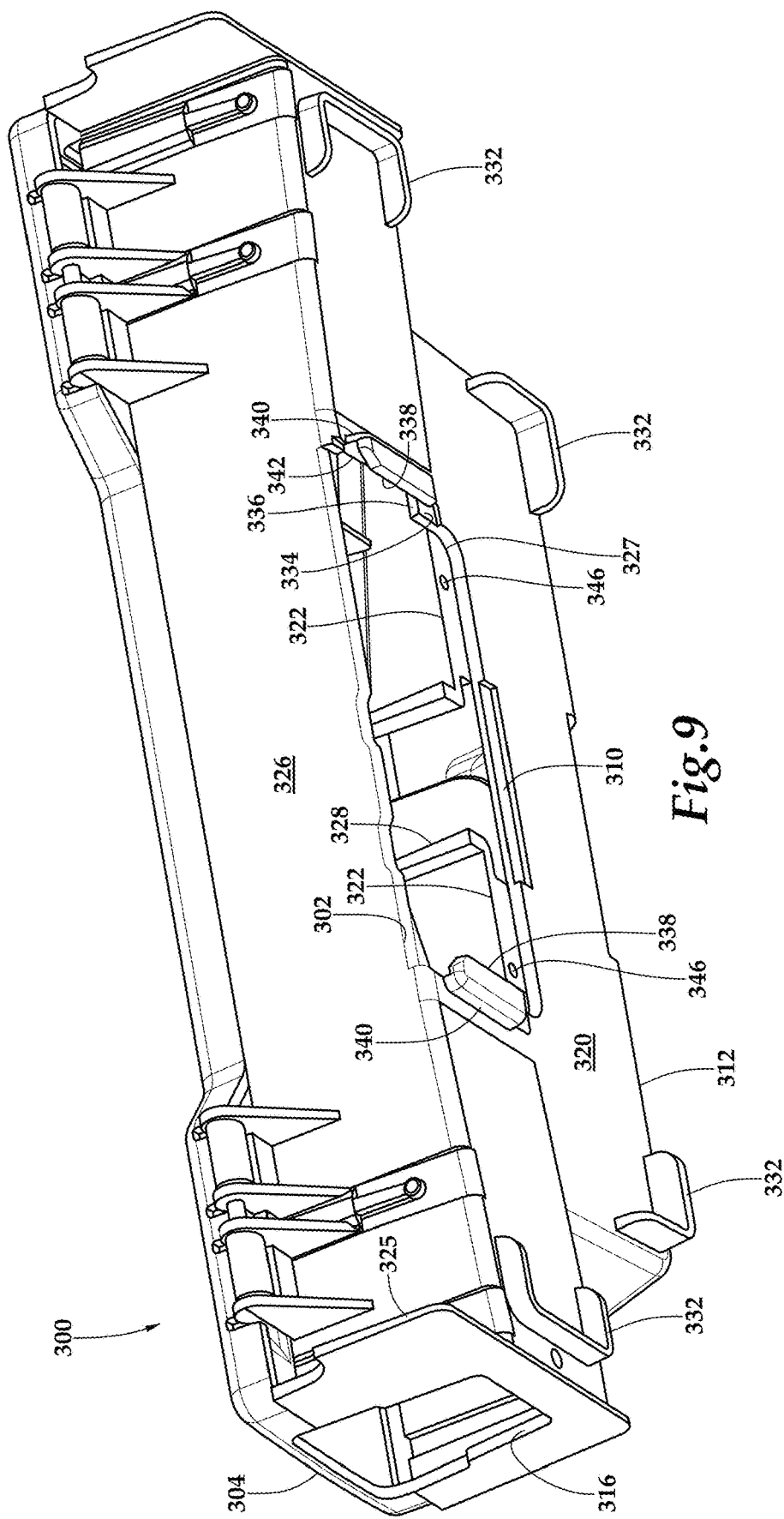
FIG. 9 is a bottom axonometric view of the repeating rodent trap of FIG. 7 showing the opening for receipt of the sensor module therein.

To allow the full travel of the entrance ramps and the smooth operation of the multiple catch trap 300, it is desirable that the threshold surface 53 of the platform 39 of the sensor module 20 be at substantially the same level as the floor of the bottom wall 320. To achieve this, a bottom opening 327 is defined in the bottom wall 320, and the module platform 39 threshold surface 53 takes the place of a portion of the floor of the device. As shown in FIG. 9, two parallel channels 334 defined by a top member 336 and a bottom member 338 are positioned to receive the rails 52 of the sensor module 20. The top member 336 of each channel 334 is defined by a portion of the bottom wall 320 adjacent one of the interior walls 322. The bottom member 338 of each channel is spaced below the bottom wall 320 by side web 340. There is thus an opening 342 above each bottom member 338 rearwardly of the top member 336, an arrangement which facilitates the injection molding of the part.

The recess 310 opens downwardly to receive the sensor module 20 register tab 70 when the module 20 is assembled to the device 300. The screw bosses 308 have downwardly opening fastener holds 346 to receive the upwardly extending screw fasteners 68. The cut-away 327 in the bottom wall 320 is continuous with the rear opening 302, thus allowing the platform of the sensor module to be inserted from the rear of the trap 300 and received with the trap such that the threshold surface 53 of the platform 39 closes the underside of the trap and allows rodents to pass over it into the rodent compartment 330. Feet 332 are positioned at the corners of the trap 300 to space the bottom wall 320 sufficiently above a supporting surface to allow the module platform and bottom cover 34 to extend beneath the trap. As shown in FIGS. 7 and 7A, the detents 306 are located on the undersides of the top members 336.

Figure 10:
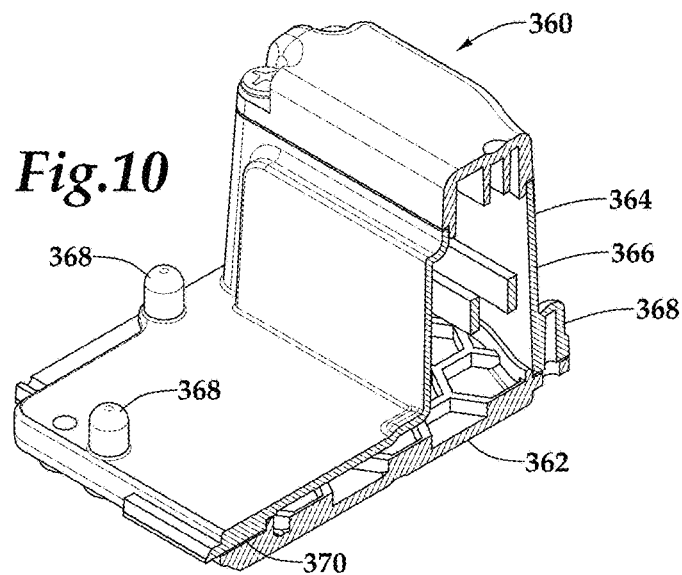
FIG. 10 is an isometric cross-sectional view of an alternative embodiment sensor module of this invention.
Figure 11:
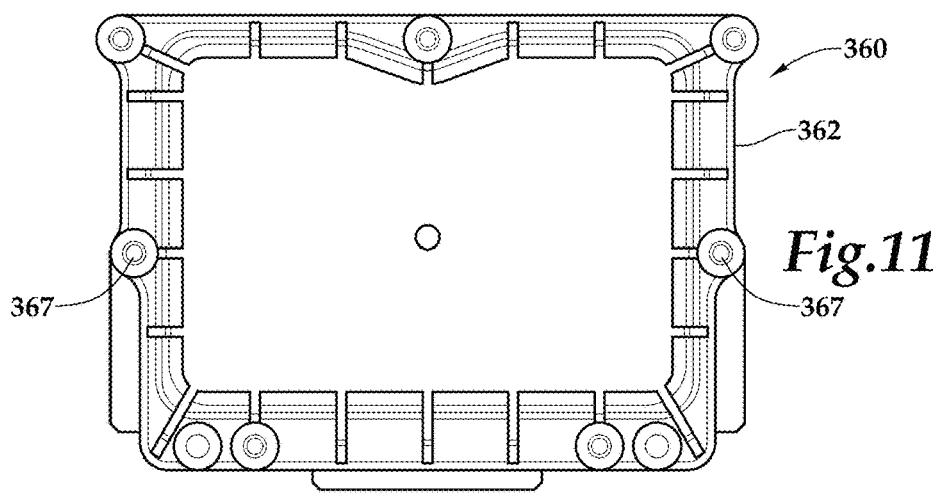
FIG. 11 is a bottom plan view of the sensor module of FIG. 10.

An alternative embodiment sensor module 360 is shown in FIGS. 10-11 for use with an alternative embodiment mouse bait station 361. The module 360 performs substantially as the module 20 discussed above, but has a bottom cover 362 which is connected to the central element 366 of the housing 364 by screw fasteners 367 which extend through the bottom cover into molded plastic bosses 368 which project upwardly from the housing central element 366. To provide a water-tight seal between the bottom cover 362 and the lower perimeter of the housing central element 366, the bottom cover 362 or the housing central element may be comolded with a resilient plastic material to define a resilient gasket 370. Alternatively, the gasket may be formed separately and engaged with projections on the housing to obtain a water-tight seal.

Figure 12:
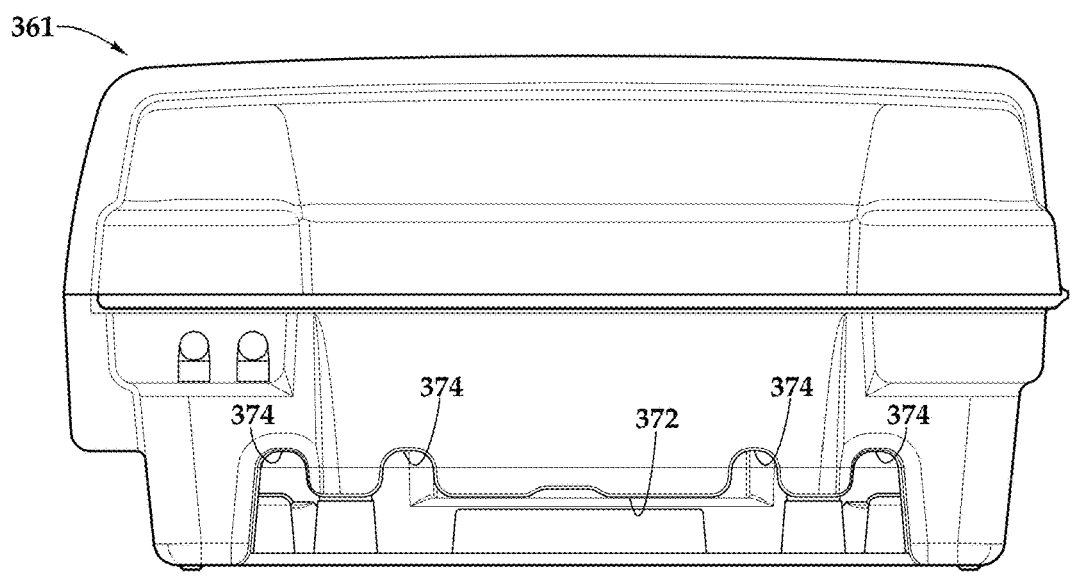
FIG. 12 is an alternative embodiment rodent control device for receiving the sensor module of FIG. 10.

As shown in FIG. 12, the rodent control device 361 may be similar to the bait station device 200 discussed above, with the difference that the rear opening 372 is provided with multiple relief openings 374 which provide clearance for the fastener bosses 368 of the sensor module 360 when it is received in the device 361.

It should be understood that the term sensor module is not used as a generic or a nonce term. Applicant has disclosed a particular sensor module and described the general elements contained therein, but the term includes any device incorporating: a power source, a radio transceiver, and a sensor which can detect a rodent passing over a threshold on a rodent trap, connected together to transmit a signal that a rodent has passed over the threshold. Although a capacitance sensor is shown and described, other sensors may be used which can detect through a portion of the rodent control device such as seismic, shock, sonic, ultrasonic, and electromagnetic including radio frequency radar.

It is understood that the invention is not limited to the particular construction and arrangement of parts herein illustrated and described, but embraces all such modified forms thereof as come within the scope of the following claims.

I claim:

1. A module for housing sensor electronics for a rodent control device having two parallel channels which open rearwardly, the module comprising:
    a shell having a front wall which extends upwardly, the shell defining a battery compartment;
    a battery holder within the shell;
    a platform which extends frontwardly from the shell front wall and having an upper wall which defines a threshold for the passage of rodents thereover;
    two parallel rails spaced on either side of the platform, the rails extending frontwardly for reception within the rodent control device channels;
    upwardly extending portions of the module in proximity to the platform positioned to engage within the rodent control device to restrain motion of the module in a rearward direction;
    a bottom cover positioned beneath the platform and fixed thereto to define an electronics cavity between the cover and the platform upper wall configured to receive rodent detecting electronics therein, wherein the cavity communicates with the battery compartment; and
    a top cover releasably secured to the shell and removable to provide access to a battery within the battery holder, wherein the module is slidable into the rodent control device channels for fastening to the rodent control device.

2. The module of claim 1 wherein the platform has a first vertical thickness, and wherein the rails have a vertical thickness which is less than the first vertical thickness.

3. The module of claim 1 wherein each rail extends frontwardly in a first direction, and wherein the upwardly extending portions of the module in proximity to the platform positioned to engage within the rodent control device to restrain motion of the module in a rearward direction comprise portions of each rail which define upwardly opening grooves extending in a direction perpendicular to the first direction, the grooves positioned to receive a downwardly extending detent positioned on the rodent control device.

4. The module of claim 1 further comprising a front register tab which extends frontwardly from the platform for receipt within a cavity within the rodent control device.

5. The module of claim 1 wherein an internal wall extends vertically within the shell, and wherein the battery holder is disposed on one side of the internal wall, and an antenna compartment is defined between the shell and the internal wall on an opposite side of the internal wall from the battery holder, the antenna compartment communicating with the electronics cavity.

6. The module of claim 1 wherein the platform has a peripheral lip which extends downwardly from the upper wall and which encircles the electronics cavity, and wherein an opening to receive a fastener is defined in the platform exterior to the electronics cavity.

7. The module of claim 1 further comprising a gasket disposed between the platform and the bottom cover, and wherein the bottom cover is fixed to the platform by a plurality of fasteners to compress the gasket and define a water-tight seal between the bottom cover and the platform.

8. The module of claim 1 wherein each rail has an entrance portion which has an inclined front upper surface which serves to guide the rail into position with the rodent control device.

9. A rodent control assembly comprising:
   a rodent control device comprising a container having a rodent opening for the passage of rodents into an interior thereof, the rodent control device having a bottom wall extending from the rodent opening, and a rear wall extending upwardly from the bottom wall, wherein portions of the bottom wall define a top member and a bottom member spaced from one another to define a rearwardly extending channel, wherein the rear wall has a first opening therein aligned with the rearwardly extending channel;
   a module for housing sensor electronics having a shell with a front wall which extends upwardly, the shell defining a battery compartment, wherein a platform extends frontwardly from the shell front wall and which has an upper wall which defines a threshold for the passage of rodents thereover, wherein a rail extends sidewardly from the platform, the rail extending frontwardly and being slidably received within the channel of the rodent control device; and
   a bottom cover positioned beneath the platform and fixed thereto to define an electronics cavity between the cover and the platform upper wall, the cavity being configured to receive rodent detecting electronics therein, wherein the cavity communicates with the battery compartment within the shell which is positioned above, wherein the module is slidable into the rodent control device through the first opening and is fastenable to the rodent control device.

10. The rodent control assembly of claim 9 wherein the rodent control device rear wall first opening extends vertically a height which is greater than a height of the module, such that a majority of the volume of the module is received within an interior of the rodent control device frontward of the rear wall.

11. The rodent control assembly of claim 9 wherein the rodent control device rear wall first opening extends vertically a height which is greater than a combined height of the platform and the bottom cover which is fixed thereto but is less than a vertical height of the module, such that a majority of a volume of the shell is positioned exterior to the rear wall.

12. The rodent control assembly of claim 9 wherein the top member of the rearwardly extending channel overlies the rail of the module, and the bottom member of the rearwardly extending channel underlies the rail.

13. The rodent control assembly of claim 9 wherein the top member of the rearwardly extending channel overlies the rail of the module, and the bottom member of the rearwardly extending channel underlies the bottom cover of the module.

14. The rodent control assembly of claim 9 further comprising a fastener which extends vertically through a mounting hole in the module to secure the module to the rodent control device, wherein the mounting hole does not pass through the electronics cavity.

15. The rodent control assembly of claim 14 further comprising a boss extending upwardly from the bottom wall of the rodent control device and having a fastener hole therein which receives the fastener.

16. The rodent control assembly of claim 9 wherein the sensor module has a front register tab which extends frontwardly from the platform and is engaged within a cavity within the rodent control device.

17. The rodent control assembly of claim 9 further comprising a rodent sensing electronics disposed within the electronics cavity and having an antenna which extends upwardly within the shell.

18. The rodent control assembly of claim 9 wherein each rail has an entrance portion which has an inclined front upper surface which serves to guide the rail into position within one of the channels of the rodent control device.

19. A rodent control assembly comprising:
   a rodent control device having a cover connected to a base to define an interior volume, wherein the base has a rear wall extending between two side walls which extend upwardly from a bottom wall, and wherein the base has at least one rodent access opening which communicates with the interior volume, the rodent access opening communicating with a rodent runway within the interior volume, and wherein the cover is movable between a closed position overlying the base, and an open position revealing the base;
   a module for housing sensor electronics having a shell with a front wall which extends upwardly, wherein a platform extends frontwardly from the shell front wall, the platform having an upper wall which defines a threshold for the passage of rodents thereover along the rodent runway, the platform extending frontwardly through a first opening in the base rear wall; and
   the module having a bottom cover positioned beneath the platform and fixed thereto to define an electronics cavity between the cover and the platform upper wall, the cavity being configured to receive rodent detecting electronics therein, wherein the cavity communicates with an interior of the shell which is positioned thereabove, wherein the module is slidable into the rodent control device through the first opening and is fastenable to the rodent control device so as to dispose the threshold in the interior of the rodent control device so that the threshold is accessible to rodents entering the rodent control device through the at least one rodent access opening, wherein the module is insertable into the base without opening the cover of the rodent control base.

20. The rodent control assembly of claim 19 wherein the rodent control device has interior dividing walls which define a rodent engagement compartment above the bottom wall for the retention of rodent bait, and wherein two parallel channels are defined within the interior volume which extend frontwardly and which are accessible from the first opening in the rear wall, and wherein the module has two parallel rails spaced on either side of the platform, the rails extending frontwardly for reception within the rodent control device channels.

21. A rodent control assembly comprising:
   a rodent control device having a cover connected to a base to define an interior volume surrounded by exterior walls, wherein the base has a rear wall extending between two side walls which extend upwardly from a bottom wall, the cover, the base rear wall and the side walls being parts of said exterior walls, and wherein the base has at least one rodent access opening which communicates with the interior volume, the rodent access opening communicating with a rodent runway within the interior volume, and wherein the cover is movable between a closed position overlying the base, and an open position revealing the base;

portions of the exterior walls which define a first opening which opens to the rodent runway;

a module for housing sensor electronics having a shell with a frontwardly extending platform, the platform having an upper wall which defines a threshold for the passage of rodents thereover along the rodent runway;

the module having a bottom cover positioned beneath the platform and fixed thereto to define an electronics cavity between the bottom cover and the platform upper wall;

rodent detecting sensor electronics received within the cavity; and wherein the module is slidable into the rodent control device through the first opening and is fastenable to the rodent control device so as to dispose the threshold in the interior of the rodent control device along the rodent runway so that the threshold is accessible to rodents entering the rodent control device through the at least one rodent access opening, wherein the module when inserted into the rodent control device blocks the first opening to prevent the passage of rodents therethrough.

* * * * *